Jan. 12, 1971     D. B. SUGDEN     3,554,604

VIBRATOR SYSTEMS AND ROCK CUTTER TYPE UTILIZATION MECHANISMS

Original Filed Aug. 21, 1968     7 Sheets-Sheet 1

FIG__1

FIG__2

FIG__3

DAVID B. SUGDEN
*INVENTOR.*

BY Graybeal, Cole & Barnard
ATTORNEYS

FIG__7

FIG__9

FIG__8

DAVID B. SUGDEN
INVENTOR.

ATTORNEYS

FIG__10

FIG__11

Jan. 12, 1971     D. B. SUGDEN     3,554,604

VIBRATOR SYSTEMS AND ROCK CUTTER TYPE UTILIZATION MECHANISMS

Original Filed Aug. 21, 1968     7 Sheets-Sheet 7

DAVID B. SUGDEN
INVENTOR.

BY *Graybeal, Cole & Barnard*

ATTORNEYS

United States Patent Office 3,554,604
Patented Jan. 12, 1971

3,554,604
VIBRATOR SYSTEMS AND ROCK CUTTER TYPE UTILIZATION MECHANISMS
David B. Sugden, Kingston Beach, Tasmania, Australia, assignor to James S. Robbins and Associates, Inc., Seattle, Wash., a corporation of Washington
Original application Aug. 21, 1968, Ser. No. 754,322. Divided and this application Nov. 24, 1969, Ser. No. 877,587
Int. Cl. E21c 25/16
U.S. Cl. 299—34                     9 Claims

ABSTRACT OF THE DISCLOSURE

A first member includes an inner cavity containing a second member which diametrically is slightly smaller than the cavity and axially is snugly received in the cavity. One of the members is connected to a large mass backup structure and the other is free for orbiting radial shifting movement within the limits of the radial gap between the members. Radially movable seals carried by one of the members divide the gap into a plurality of pulse chambers. A separate bidirectional flow passageway leads into each pulse chamber. Fluid pressure pulses are distributed around the gap in repetitive cyclic fashion from pulse chamber to pulse chamber. A radial piston type pulse generator divided into two axially spaced sets of pistons moved radially by separate rotary cams offset on opposite sides of a cam shaft. A cutting edge on such a first member, and means for moving the backup structure to advance the cutting edge into an earth formation.

---

This application is a division of application Ser. No. 754,322, filed Aug. 21, 1968.

BACKGROUND OF THE INVENTION

Field of the invention

This invention relates to an orbiting radial force pulse type vibrator, to specific fluid pulsator systems (including specific pulse generators and specific pulse receivers) for creating the force field, and to rock cutting type utilization mechanisms.

Description of the prior art

Others have proposed making rock cutters vibrate for the purpose of enhancing their cutting action. However, no earth mining machine is known which comprises small mass cutter wheels which normally orbit and a large mass backup structure which orbits whenever cutting wheel movement is restrained by the material being cut, and in so doing establishes high order inertial forces which are transmitted through the stalled cutter(s) to the earth material.

U.S. Pat. No. 2,659,585, issued Nov. 17, 1963 to Robert A. McCallum discloses a technique of digging or breaking earth material by use of a rotary digging head which contains an out-of-balance weight. Rotation of the assembly results in a simultaneous rotation and vibratory movement of digging elements carried by the head. In this system the vibratory movement is caused solely by the rotating weight, and it is necessary for such weight to be relatively large if its addition is to materially enhance the digging action. The digging wheel and the weight are supported by a relatively husky drive shaft which in turn is supported by several apparently large capacity bearings.

U.S. Pat. No. 3,235,311 relates to mining machines comprising cutter bits which are normally forced into the material which they cut by machine or cutterhead advancement alone, but are adapted to reciprocate in the manner of a percussion bit whenever they encounter above normal resistance from the material being cut.

U.S. Pat. No. 3,193,256, issued July 6, 1965 to George L. Malan, discloses a fluid powered vibrator which includes a ring shaped rotor which orbits about the inside of a cylindrical casing, and is moved by the output of a continuous delivery pump, which output is divided into pressure pulses by a system of valves.

SUMMARY OF THE INVENTION

In basic concept this invention relates to a vibrator type mechanism characterized primarily by an orbiting small mass member supported on a relatively large mass backup structure, which is adapted to itself orbit whenever the small mass member is prevented from moving by a restraining load, and to transmit a high inertial force created by its movement through the small mass member to whatever load is tending to restrain such small mass member against movement.

According to the invention the large mass backup structure includes a mounting member for the small mass member. The small mass member is free for 360° of limited radial movement relative to its mounting member. Means are provided for generating short duration radial force pulses between the members, and for cycling the pulses throughout the 360°. This causes an orbital movement of the small mass member when it is not restrained. However, when the small mass member is loaded to the extent it is at least partially restrained from moving, the cycling force pulses operate to orbit the backup structure.

The vibrator system of this invention has general utility. However, the present principal interest in the system is its adaptability to earth mining operations, and in particular to hard rock cutting. According to one embodiment of the invention the small mass member may take the form of a cutter wheel having a peripheral cutting edge, with the large mass backup structure being an earth mining or boring machine, e.g. the type shown by FIG. 3 of the aforementioned U.S. Pat. No. 3,235,311; the type disclosed by U.S. Pat. No. 3,232,670, issued Feb. 1, 1967 to Richard J. Robbins et al.; or the type disclosed by U.S. Pat. No. 3,200,494, issued Nov. 30, 1965 to Robert E. Cannon et al.

Preferably, the rotating force field is established by a pulsator type fluid system in which the orbiting cutter wheel and its mounting member are principal components of the pulse receiver, and such pulse receiver includes a ring of variable volume fluid chambers which receive fluid pressure pulses from a pulse generator having a like number of variable volume chambers, each of which is coupled to one of the chambers of the pulse receiver. In operation, columns of a substantially incompressible fluid are moved through interconnecting back and forth conduits between the variable volume chambers of the generator and the corresponding variable volume chambers of the receiver, primarily by an energy input into the generator. However, one principal advantage of the pulsator type system in a rock cutting mechanism is that energy transmitted to rock which does not break but rather reacts elastically is transmitted by the rock back into the system for moving the fluid columns back to the generator.

BRIEF DESCRIPTION OF THE DRAWING

Reference is now made to the accompanying illustrations of certain embodiments of the invention, wherein like numerals refer to like parts, and wherein.

DESCRIPTION OF THE PREFERRED EMBODIMENTS

Figure 1:
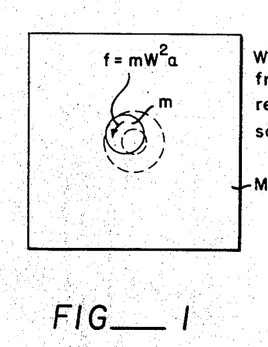
FIG. 1 is a diagram depicting a large backup mass still and a small mass orbiting.
Figure 2:
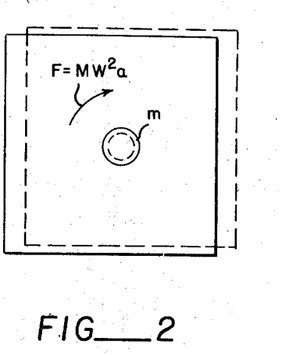
FIG. 2 is a diagram similar to FIG. 1 but depicting the small mass restrained and the large mass orbiting.

Herein the term "orbiting" means the center of the orbiting member travels a circular path with little or no actual rotation of the member about its center. FIG. 1 diagrammatically shows a small mass member $m$ (e.g. a cutter wheel) orbiting relative to a stationary large mass backup structure M. FIG. 2 diagrammatically shows the small mass member $m$ still (as when restrained) and the large mass member M orbiting. In each case the inertial force $f$, F is a product of the mass $m$, M and the angular acceleration, $\omega^2 a$. Since the angular acceleration is constant (because the displacement is constant) the ratio of the inertial forces equals the ratio of the masses. Thus, for example, if the large mass M is one thousand times as great as the small mass $m$, the inertia force F of the large mass M, when the small mass is entirely still, is one thousand times the inertia force $f$ of the small mass $m$. Accordingly, when the small mass $m$ tends to stall the large mass M begins to work, and the greater the tendency to stall the greater the contribution of the large mass M.

Figure 3:
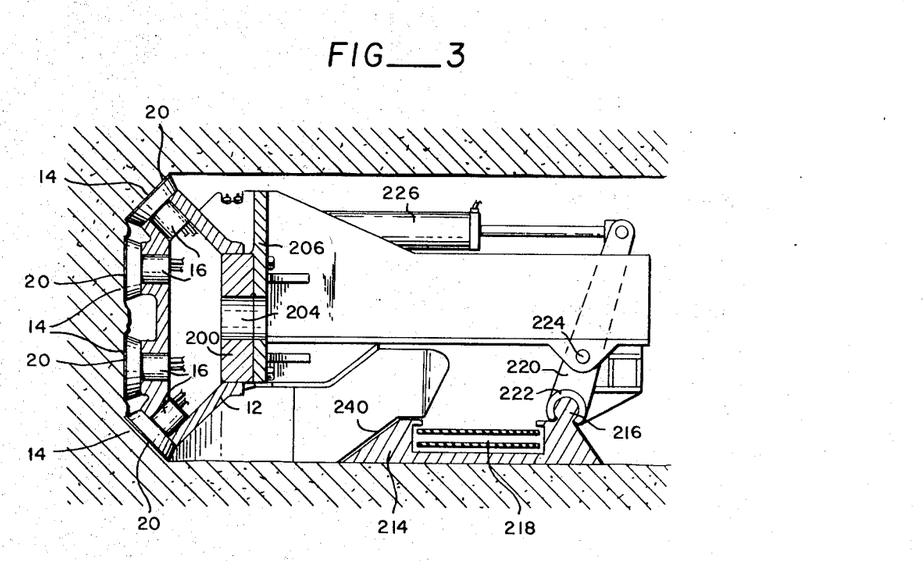
FIG. 3 is a transverse sectional view taken through the midportion of a rock planing machine typifying one aspect of the invention, the section being taken substantially along line 3—3 of FIG. 4.
Figure 4:
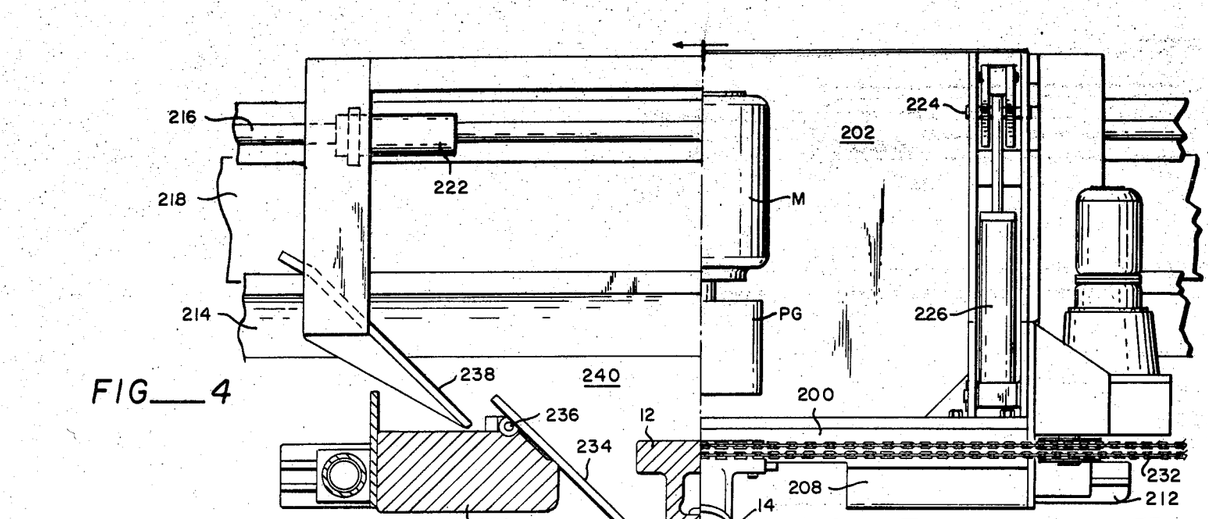
FIG. 4 is a top plan view of the planing machine of FIG. 3, showing a portion of the machine in section, such view being taken substantially from the aspect indicated by line 4—4 of FIG. 5.
Figure 5:
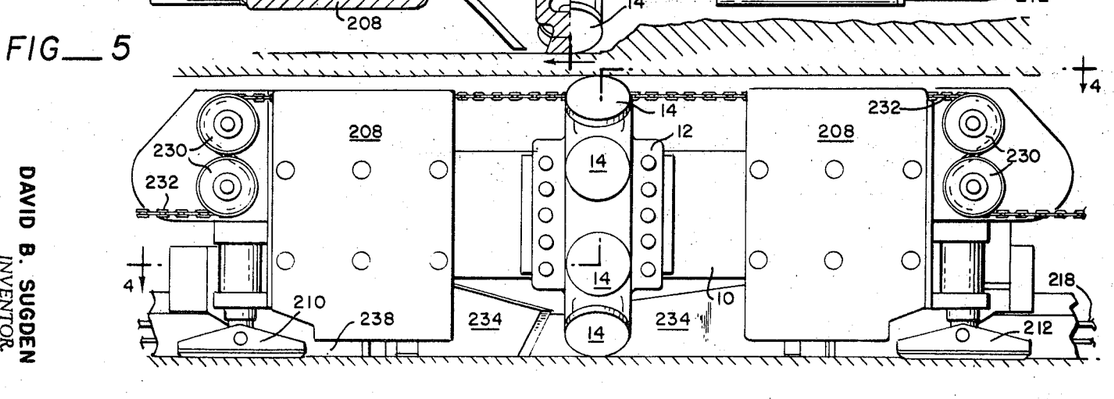
FIG. 5 is a side elevational view of the mining machine looking toward the cutterhead side thereof.

The planar shown in FIGS. 3–5 is especially adapted for planing operations of the type described in U.S. Pat. No. 3,310,346, issued Mar. 21, 1967 to Willie Heyer. It is shown to comprise a main frame 10 which carries a side placed cutterhead 12 intermediate its length. By way of typical and therefore non-limitive example, the cutterhead 12 is shown to carry four cutter assemblies 14. The intermediate pair of cutter assemblies 14 are vertically oriented, and the upper and lower cutter assemblies 14 are diagonally oriented so that they cut on about a 45° angle extending between the vertical side wall being cut and the roof and floor of the room being formed.

Figure 6:
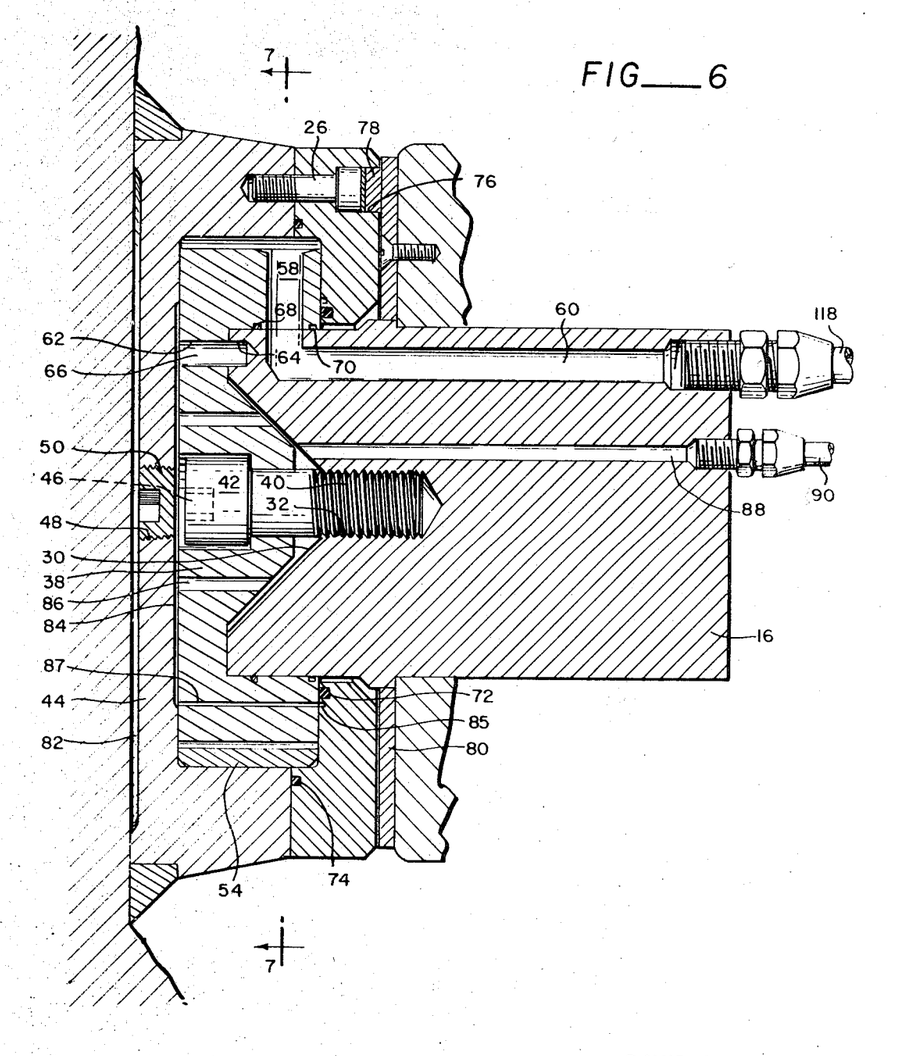
FIG. 6 is an axial sectional view of one of the cutter assemblies, taken substantially along line 6—6 of FIG. 7.
Figure 7:
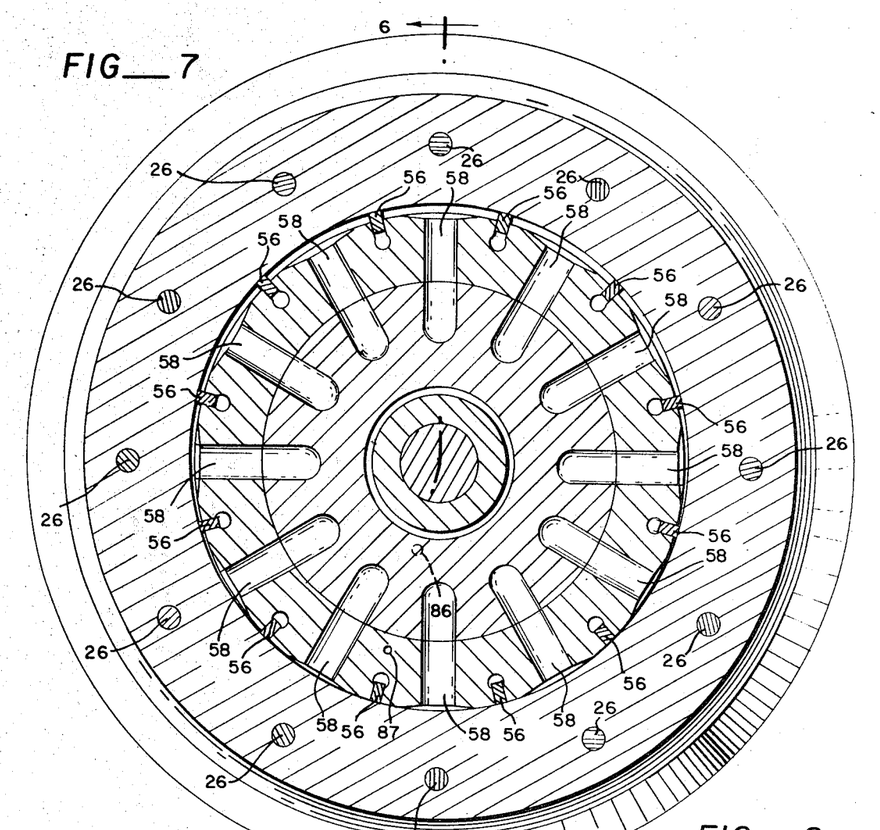
FIG. 7 is a cross sectional view taken through the cutter assembly, substantially along line 7—7 of FIG. 6.

Referring to FIGS. 6 and 7, the mounting means for each cutterhead includes a short stub shaft 16 which is rigidly attached to the cutterhead 12. Each cutter assembly 14 includes a mounting head 18 which is attached to the end of its stub shaft 16, in a manner to be hereinafter described in detail, and a cutter wheel 20.

In the illustrated embodiment each cutter wheel 20 comprises a major part 22 and a minor part 24, both of which are formed to include a cup-like recess in its axial inner portion. The minor part 24 includes a central opening for receiving the outer end portion of the stub shaft 16. The cup-like recess of the major part 22 and the cup-like recess of the minor part 24 together form an inner cavity for receiving the mounting head 18. The two parts 22, 24 may be secured together about the head by means of a circular array of cap screws 26 which in the illustrated embodiment are shown to extend through and be countersunk in the minor part 24, and to anchor in the major part 22.

The cutting edge may be formed on the major part 22, but preferably is formed on a separate annular cutting ring 28 which is firmly secured onto a peripheral portion of the cutting wheel 20. This latter construction makes it possible to fabricate the cutting edge from a harder and usually more expensive material (e.g. tungsten carbide) than the rest of the cutter wheel. It also makes it possible to replace the cutting ring when it wears out and there is still life left in the cutter wheel proper.

In preferred form a conical socket is formed in the outer end of shaft 16, and a tapped bore extends axially inwardly through the shaft 16 beyond the bottom of the socket 30. The mounting head comprises an annular peripheral portion 34, a radially extending outer wall 36, and an axially inwardly, generally conical boss 38 sized to relatively closely fit within the socket 30. As clearly shown by FIG. 4, the side recess formed in the mounting head 18 radially between the peripheral portion 34 and the boss 38 is sized to snugly receive and accommodate the outer end portion of the shaft 16. A slight clearance is allowed between the conical wall of the boss 38 and the conical wall of the recess 30, and such clearance forms a part of a fluid path which will hereinafter be described.

The mounting head 18 is secured to the shaft 16 by a single cap screw which extends through the center of boss 38 and threads into the tapped bore 32. Cap screw 40 is countersunk into the mounting head 18 so that its head portion 42 does not project outwardly beyond the outer radial surface of the mounting head 18. The circular end wall 44 of the cutter wheel includes a tapped opening at its center, coaxial with the wrench socket 46 formed in the head 42 of the cap screw 40. Opening 48 is provided with a flush cap 50 which includes a wrench socket 52. By way of typical and therefore non-limitive example, the wrench sockets 46, 52 may be hexagonal in shape and operable by a hex key wrench.

An annular insert 54 made from a hard bearing material is fitted into the inner cavity of the cutting wheel 20 to form a liner therefor. This also facilitates manufacturing a square corner between the straight side wall and the cylindrical peripheral wall of the inner chamber.

As clearly shown by FIG. 6, the axial length of the mounting head is approximately equal to the axial dimension of the inner cavity of the cutter wheel 20, i.e. close clearances exist between the radial surfaces of the mounting head and the radial surfaces of the inner cavity. However, a gap (e.g. 0.050 inch) is intentionally provided radially between the mounting head 18 and the surrounding cylindrical surface of the cutter wheel. This gap is divided into a plurality of pulse chambers by means of a plurality of radially movable seals, shown in the form of radially reciprocating vanes set within radial slots or pockets formed in the mounting head 18. Each pulse chamber is completely closed except for a single induction-eduction port (i.e. a bidirectional flow port), and whatever leakage that may occur.

In the illustrated embodiment a separate bidirectional flow passageway extends to each port 58, first axially and then radially through the fixed shaft 16.

Since the mounting head 18 is attached to the shaft 16 by a single cap screw 40, alignable openings 62, 64 are provided in the mounting head 18 and the shafts 16, respectively for receiving an alignmnet pin 66. When the openings 62, 64 are in alignment the radial ports 58 are in correct alignment with the radially extending outer portions of the passageways 60.

The cutter assembly may be assembled in the following manner. Starting with the cutter wheel 20 apart, the bearing ring 54 is inserted into the major part 22. The cap screw 40 is inserted into the mounting head 18, and then the mounting head is inserted into the outer part 22. Next the seals 56, the alignment pin 66 and the O-rings 68, 70 are installed. Then the O-rings 72, 74 are set in place in grooves formed for them in the minor part 24, and the minor part 24 is set into place and secured to the major part 22, by means of the cap screws 26. The heads of the cap screws 26 are countersunk into the minor part 24 a sufficient distance to provide room for an annular groove. Annular dirt seal, shown in the form of an annular metal backed resilient member, with a circumferentially grooved exposed surface, is press fitted into the channel.

As should now be evident, the mounting head 18, the cutter wheel 20 and the dirt seal 78 all together constitute a single unit which is attachable to the fixed shaft 16 by means of a single fastener, i.e. the cap screw 40. It is installed by merely pointing the inner end of the cap screw 40 into the conical socket 30, turning the unit somewhat, if necessary, to align the projecting end portion of pin 66 with the opening or socket 64. Next a hex key wrench is inserted through the access opening 48 and used to tighten the cap screw. The plug 50 is then installed in opening 48.

Preferably, an annular wear collar 80 is attached to the cutterhead 12 in the region thereof surrounding each shaft 16, and the projecting ridges of the dirt seal 78 contact the outer surface of the member 80.

A recess is formed in both the outer and inner sides of the cutter wheel wall 44. The outer recess 82 merely provides a clearance where contact between the cutter wheel 20 and the rock or other material being cut is not wanted. The inner recess 84 is provided for generally the same purpose, i.e. to provide clearance where contact between the cutter wheel wall 44 and the mounting head 18 is undesirable. In addition, clearance 84 serves to collect fluid that has leaked from the pulse chambers and directs it to axial ports 86 which communicates recess 84 with the clearance which exists between boss 38 and the wall of socket 30. An annular groove 85 in the radial wall portion of part 24 serves to collect leakage on the opposite side of the head 18, and an axial bore 87 through head 18 directs such leakage to the recess 84. The fluid leaves this latter space via a collection passageway 88 extending axially through the shaft 16 to a fluid conduit 90 provided for carrying such fluid away.

For clarity of illustration, in FIG. 6 only one seal 56 has been referenced and the bidirectional flow passageways have been omitted. The pulse chambers have been numbered I–XII and an arrow 90 is provided to show the direction of pulse travel or "phase rotation." In operation of the cutter, fluid pressure pulses are rapidly distributed about the gap in cyclic fashion, from pulse chamber to pulse chamber. This rapid stepping of the pressure pulses about the gap tends to cause an orbital shifting movement of the cutter wheel 20 relative to the head 16, and such movement of the cutter wheel 20 actually occurs unless the cutter wheel 20 is restrained against movement by the substance into which the cutter wheel 20 is being moved. In FIG. 6 the head center is denoted HC and the orbital path of the true center of the cutter wheel is designated CCO. In the condition illustrated pulse chamber VII is substantially closed and pulse chamber I is at maximum volume. An instant later pulse chamber II will be at maximum volume, pulse chambers II–VII will increase somewhat in volume and pulse chambers VIII–I will decrease somewhat in volume, and the true center CC of the cutter wheel will shift in position somewhat on its orbit CCO.

As will be evident, when the cutter wheel 20 is restrained from movement by the material into which it is being advanced, the mounting head 12 tends to shift rather than the cutter wheel 20. The forces tending to cause orbital shifting movement of the mounting head 12 are transmitted through the cutterhead 12 to the frame, which as will be later described in some detail is intentionally constructed to contain considerable mass. The fluid forces transmitted through the mounting head 18 cause the frame to orbit, and as it moves a relatively high order inertial force is transmitted by its back through the mounting head 18 to the cutter wheel 20 and from the cutter wheel 20 to the rock. The fluid system is regenerative during the periods the rock is acting elastically, in that the rock transfers the energy it receives back into the system. During operation of the cutter the energy input into the hydraulic system equals the energy withdrawn plus losses. During the period of rock elasticity very little energy is withdrawn. Hence, the energy input is relatively low until the rock actually breaks, at which time the strain energy of the rock is lost and an equivalent amount of energy is withdrawn from the system.

Owning to the geometry of the system the force experienced by the cutter is determinate and can be limited to a finite maximum. Further, the fluid, though basically incompressible, provides a considerable degree of cushioning under shock loading. If a mechanical drive system were employed, there would essentially be an unlimited upper limit on the force experienced by a cutter when shock loaded. In designing the system of this invention, a maximum force may be chosen which is below the fracturing force of many hard and brittle materials, such as tungsten carbide, for example. Hence, the controllability of the maximum loading on the cutter makes it possible to successfully employ these materials for the cutting parts.

The four cutter assemblies are driven out of phase with each other, i.e. in a manner such that there is a phase difference between the pulses in each cutter, so that the combined resultant of the restraining force on all the cutters is kept at a minimum. This results in the largest possible force being transmitted to the working cutter by the smallest possible backup structure, since the mass of the backup structure is not being divided equally between all of the cutters but rather is being concentrated on only one of the cutters at a time.

In the fluid pulse receiving mechanism of this invention the sealing problem is not particularly serious, because there is provided a small phase difference between pressure pulses in adjacent pulse chambers I–XII, and as a result the pressure differential between adjacent pulse chambers is low. This feature makes it possible to employ higher maximum pressures in the receiver than would be possible if the pressure differential were greater.

Figure 9:
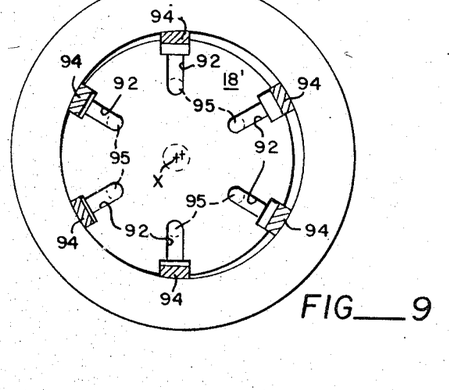
FIG. 9 is a view similar to FIG. 7 but of a modified form vibrator.

FIG. 9 shows a modified construction of the pressure receiver, usable, for example, as a concrete form vibrator. It is shown to comprise a mounting head 18' including a plurality of radially extending piston chambers 92, each containing a piston 94. Pressure pulses are cycled through bidirectional flow passageways 94 into the spaces radially inwardly of the pistons 94 in the same manner the pulsing is done in the pulse receiver of FIGS. 6 and 7. As will be evident, movement of the pistons will normally cause the small mass wheel 96 to orbit about the true center X of the mounting member 18'.

Figure 10:
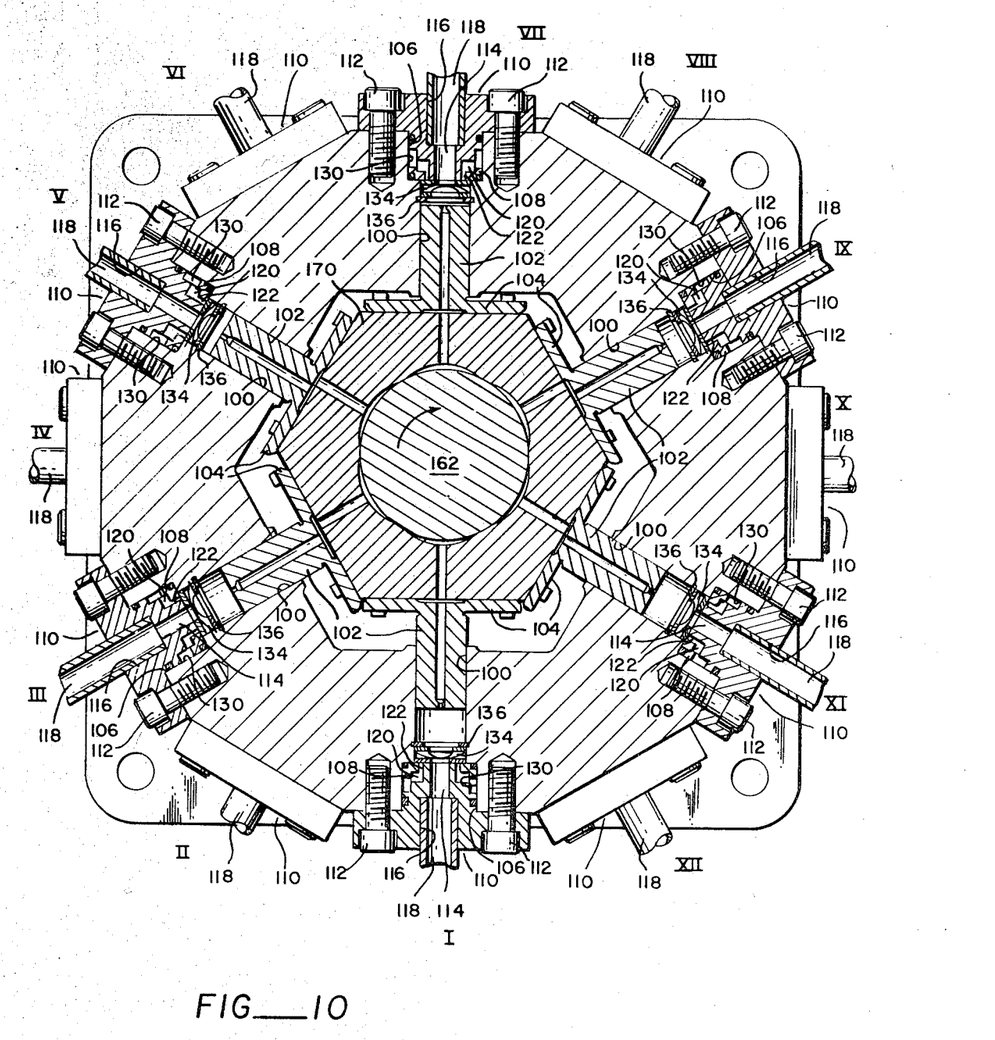
FIG. 10 is a cross sectional view of a pressure pulse generator typifying another aspect of the invention, taken substantially along line 10—10 of FIG. 12.
Figure 11:
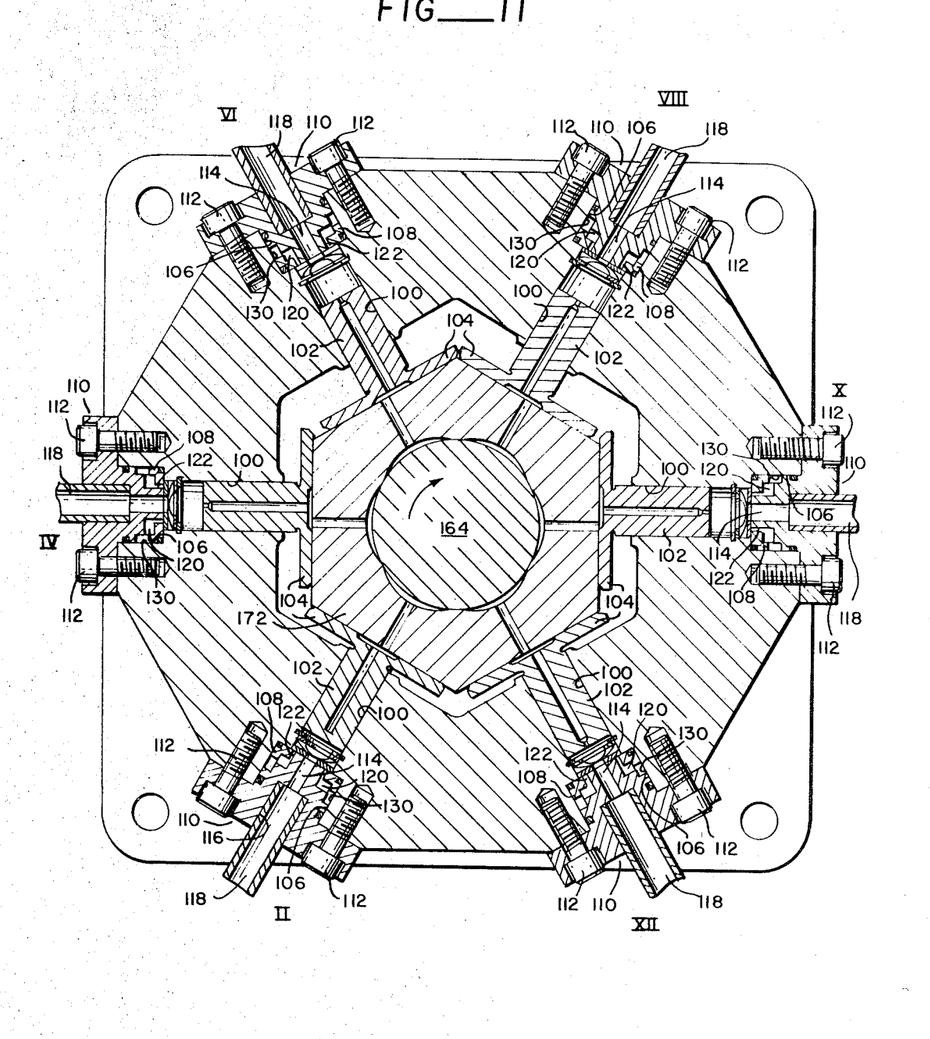
FIG. 11 is a cross sectional view of the pressure generator, taken substantially along line 11—11 of FIG. 12.
Figure 12:
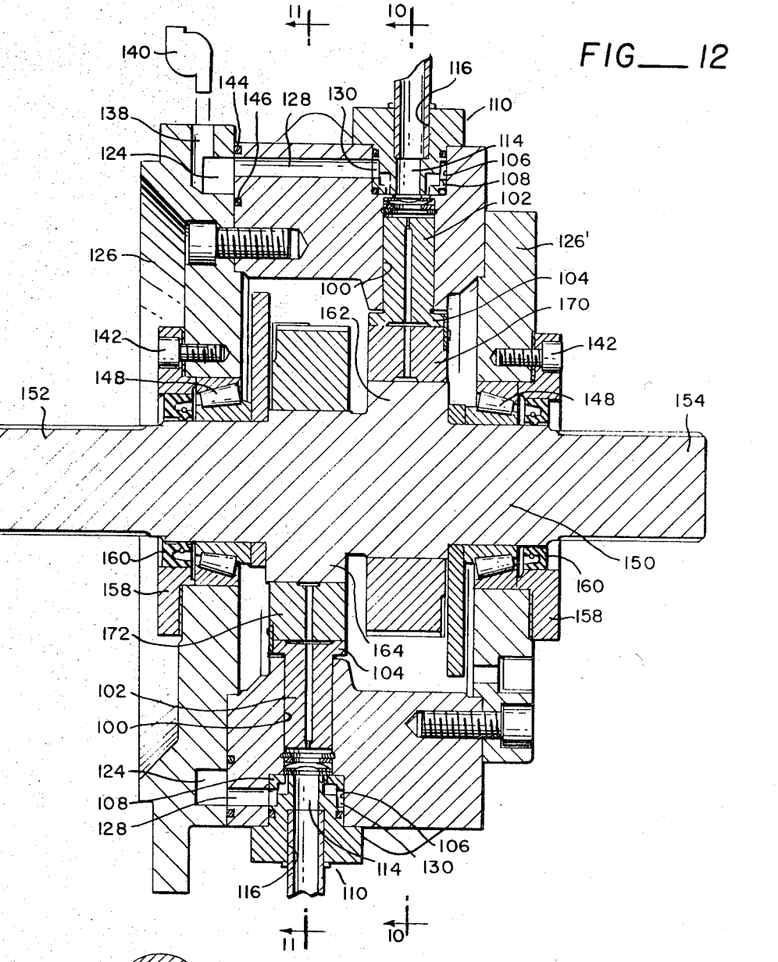
FIG. 12 is an axial sectional view, taken substantially along line 12—12 of FIG. 10.

A preferred form of pulse generator is shown by FIGS. 10–12 to comprise a main body in the nature of an open centered block 98 having formed therein two axially spaced banks of radial piston chambers, each preferably in the form of a cylindrical bore 100. Each chamber 100 is equipped with a piston having a cylindrical portion 102 snugly received in its bore or chamber 100, and a flanged base 104. The pistons 102 are fitted into the bores 100 from the space within the body. A countersink 106 is provided in the body in the region of the outlet from each piston chamber 100. A tubular inner portion 108 of an inlet-outlet fitting 110 is received in the countersink 106, and the fitting 110 is secured to the body by means of a pair of cap screws 112. A small bore 114 extends axially through the inner end portion of the fitting and a slightly larger diameter bore 116 continues therefrom and extends through the remaining portion of the fitting. The end of a conduit 118 which communicates the piston chamber with its associated pulse chamber in the pulse generator fits into each outer bore 116. An annular chamber 120 is formed in the inner portion of the fitting about the inner bore 114, and a relatively narrow gap passageway 122 extend sinwardly from each said chamber 120 and terminates in an annular outlet which is generally flush with the inner end of the fitting, and is bordered on each side by a flat end surface of the fitting.

Referring now to FIG. 12, an annular manifold 124 is formed in the left (as pictured) end plate 126. A fluid delivery port, shown in the nature of a bore 128 formed axially through the radially outer portion of the body, communicates the annular manifold with an annular passageway 130 surrounding the inner end portion of the fitting, and such annular passageway 130 is in communication with the annular chamber 120.

The annular outlet from each passageway 122 is normally closed by a flat washer valve 132 which is normally biased outwardly by a washer like spring 134. The spring 134 is sandwiched between the movable washer valve 132 and a fixed washer 136 which is firmly anchored to the body 98 near the outlet of its piston chamber. As shown, the spring 134 is in the nature of a bowed washer. It is resilient enough that it will flatten out when subjected to enough pressure by the washer valve, permitting the valve to move inwardly and unblock the annular passageway. This type of valve is quick to respond. It has to be quick because the time period for delivery of makeup fluid is very short.

The annular manifold 124 in end plate 126 receives make-up fluid via an inlet port 138, from a booster pump 140 shown only schematically in FIG. 12.

The two end plates 126, 126' are secured to the body 98 each by means of a circular array of cap screws 142 or the like. O-rings 144, 146 are inset into the body on the radial inner and outer sides of the annular manifold 124. The end plates 126, 126' have open centers for receiving roller bearings 148 or the like which surroundingly engage and support for rotation a drive shaft 150. The drive shaft 150 is shown to include two outwardly extending, splined end portions 152, 154, one of which is connected to an electric motor or other prime mover 156. The opposite end of the shaft may be secured to one end of a similar pulse generator, so that both of the generators can be powered by a single drive mechanism. In the usual fashion, a seal assembly 158, including an annular seal member 160 which surroundingly engages the shaft 150 immediately outwardly of the bearing, is secured to each end plate 126, 126'.

Figure 8:
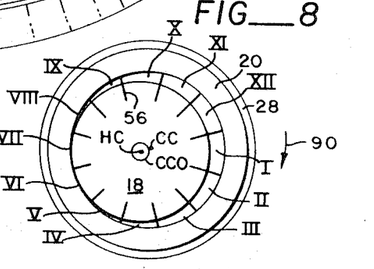
FIG. 8 is a diagram showing the fixed true center of the mounting head in relationship to the circular path of travel of the true center of the cutter wheel.

Interiorly of the body the shaft includes a pair of circular cams 162, 164 which are eccentrically related to the shaft proper. As FIG. 12 and a comparison of FIGS. 10 and 11 will show, the cams 162, 164 are offset from each other generally on opposite sides of the shaft, so that the radial loadings on the shaft during operation are as close to being balanced as is possible. In the illustrated embodiment each bank of pistons comprises six pistons. The twelve pistons are phased thirty degrees (30°) apart and are operated in the sequence depicted in FIG. 11, using for each piston the number of its corresponding pulse chamber in FIG. 8.

Referring to FIG. 12, a plate type counterweight 166, 168 is positioned axially outwardly of each cam 163, 164 and extends radially outwardly from the shaft 150 on the side thereof opposite the cam. The weight 166, 168 are sized and weighted appropriately to substantially counterbalance the centrifugal forces generated by the rotating and reciprocating parts.

As clearly shown by FIGS. 10 and 11, the inner cavity of the body 98 is in the shape of a polygon and has the same number of sides as there are pistons. In the illustrated embodiment the cavity for each bank of pistons is hexagonal. An operator member 170, 172 which has the same cross sectional shape as the cavity, but diametrically is somewhat smaller, snugly surrounds each cam 162, 164 and is moved thereby. The flat inner end surfaces of the pistons abut the flat peripheral surfaces of the operators 170, 172. The cavities and the shaft 150 have the same center, but the center of the cams 162, 164 is offset from the center of rotation. As a result, the cams 162, 164 shift the operators 170, 172 around the periphery of the cavity as the shaft 150 rotates. As the operators shift they sequentially displace the pistons outwardly and permit sequential return of the pistons.

Figure 13:
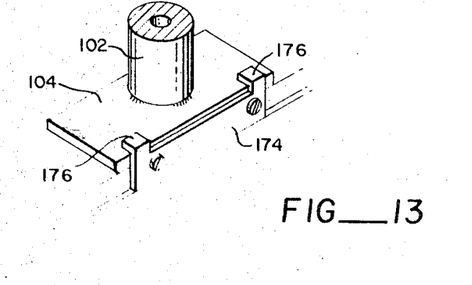
FIG. 13 is a fragmentary perspective view taken in the region of contact between the base portion of one of the pistons and the associated flat peripheral surface of the piston operator, showing the guide element which prevents rotation of the piston.

Guide clips 174 (FIG. 13) may be secured to the side surfaces of the operators closely adjacent the bases of the pistons, such clips 174 each including a pair of guide fingers 176 which loosely project over outer surface portions of the flanged bases. These clips 174 prevent unwanted rotation of the pistons but at the same time permit the relative sliding motion between the piston bases 104 and the operators 170, 172 which wants to occur while the operator is shifting. The fingers 176 also help to return the pistons during the phases the operator movement is radially inwardly.

As illustrated in FIGS. 10 and 11, cavities are provided in the operators 170, 172 between them and the cams 162, 164, and in the inner end surfaces of the pistons, between them and the operators 170, 172. These cavities are in constant communication with the pressure chambers, via meter orifice containing ports 180, 182, so that a balancing fluid cushion exists where linear sliding occurs between the pistons and the operators 170, 172, and where rotational movement occurs between the cams 162, 164 and the operators 170, 172.

Referring now again to FIGS. 3–5, the cutterhead 12 is shown to be bolted to a husky side beam 200 constituting part of the main frame 10. The pressure pulse generators PG and their drive motors M are mounted on the deck 202, laterally inwardly of the cutter head 12. As shown by FIG. 3, the cutterhead 12 is hollow, and the fluid conduits 90, 118 fan out within such hollow interior and lead outwardly to the ports 60 in the fixed shafts 16. From within the cutterhead 12 the conduits extend inwardly of the machine through a transverse opening 204 extending through both the side beam 200 and a side plate portion 206 of the main frame 10 to connections on the pulse generators.

Large and heavy pieces of steel 208 are secured to the main frame 10 both forwardly and rearwardly of the cutterhead 12 to increase the mass of the machine to the required amount.

Adjustable supporting shoes 210, 212 are supported on the cutterhead side of the machine, near the front and rear ends of the machine, respectively, and generally in line with the heavy weights. The shoes 210, 212 are pivotally attached to the lower ends of pistons which project downwardly from fluid operated adjustment rams, the cylinders of which are rigidly secured to the main frame 10.

The side of the machine opposite the cutterhead 12 travels over a floor beam 214 including a guide rail 216 and a power conveyor 218 of the type disclosed by U.S. Pat. 2,745,651, and U.S. Pat. 2,691,514, for example. The machine is guided during movement by a pair of lever arms 220, one at the front and one at the rear of the machine, having claws 222 at their lower ends which engage the floor rail 216. The levers 220 are pivoted intermediate their ends at 224 to the frame 12, and are connected at their upper ends to horizontally disposed fluid actuators 226. By virtue of this arrangement the horizontal distance between the claws and the side wall being mined can be adjusted by merely varying the stroke of the actuators 226, and the ground rail 216 does not have to be moved after each cut taken by the machine.

Further, the actuators 226 can be moved differentially so that the lead angle, or angle of cast, can be adjusted.

The machine may be moved longitudinally by means of traction wheels 230 turning on a traction chain 232 that is firmly anchored at each of its ends. The traction wheels 230 are reversible so that the machine can be moved in either direction.

A deflector-scraper member 234 is hinge connected to the frame on each side of the cutterhead within the line of travel. These members 234 are hinge connected to the frame at 236, near the ends thereof which are furtherest from the cutterhead. As a result, when the machine is moved in one direction the leading member 234 automatically closes when contacted by the floor material and the trailing member 234 automatically opens and functions to direct the cuttings on the floor rearwardly to a fixed inner deflector 238 which in turn directs the cuttings up a ramp-like apron 240 and then off the apron onto the conveyor belt.

The limits of the invention will now be measured by the following claims.

What is claimed is:

1. An earth formation cutter comprising: a relatively large backup mass; a mounting member rigidly connected to said backup mass; a relatively small mass cutter wheel surrounding the mounting member, and being free for 360° of limited radial movement relative to said mounting member unless it is restrained against such movement; and means for generating short duration radial force pulses between the cutter wheel and the mounting member, and for cycling said pulses throughout the 360°, to cause an orbiting radial shifting movement of said cutter wheel when it is unrestrained, and a counterdirectional orbital movement of said backup mass when said small cutter wheel is restrained, attended by a transfer of the inertial force of the moving backup mass to said cutter wheel.

2. A cutter wheel having an outer cutting portion and an inner cavity, mounting means including a mounting head in said inner cavity which diametrically is slightly smaller than said inner cavity, so that a gap is formed radially between said cutter and said mounting head, and which axially is snugly received in said cavity, with said cutter being free for orbiting radial shifting movement relative to said head within the limits of said gap, and with at least one of said cutter and said head including a plurality of circumferentially spaced seal slots extending axially the gap and opening radially towards said gap, a radially reciprocating seal in each said slot, said seals circumferentially dividing said gap into a plurality of pulse chambers, one between each adjacent pair of seals, a separate bidirectional flow passageway extending through said mounting means into each pulse chamber, and generator means for generating and distributing fluid pressure pulses from passageway to passageway, and thus from pulse chamber to pulse chamber, in repetitive cyclic fashion around said gap, tending to cause an orbital shifting movement of said cutter wheel relative to said mount.

3. The combination of claim 2, wherein said mounting means also includes a fixed shaft having an opening in the end thereof, said mounting head fits against said end and includes an opening therein alignable with the opening in said fixed shaft, and a removable fastener extends through both of said openings for securing the mounting head to the fixed shaft, and wherein said cutting wheel is of split construction and includes parts assemblable from opposite sides of the mounting head, and connector means for connecting said parts together about the head, whereby the mounting head with said cutter wheel attached thereto may be assembled onto and removed from the fixed shaft as a single unit by manipulation of said fastener.

4. The combination of claim 3, wherein a first portion of each bidirectional flow passageway extends through the fixed shaft and a second portion extends through the mounting head, and wherein said mounting means also includes an alignment pin and an alignment passageway extending partially through the mounting head and partially through the fixed shaft, and oriented so that when the alignment pin is inserted into the two parts thereof the portions of the bidirectional flow passageways in the mounting head are correctly aligned with the portions of such passageways in the fixed shaft.

5. A cutter wheel according to claim 3, wherein said cutter wheel includes a wall which is disposed outwardly of and covers the portion of the mounting head through which the fastener extends, and said wall includes an access opening in alignment with said fastener.

6. Mechanism for cutting earth material comprising a relatively heavy mass backup structure, and at least one cutter assembly carried by said structure and including a mounting head rigidly secured to said structure and projecting outwardly therefrom, a cutter wheel having an outer cutting portion and an inner cavity, with said mounting head being received in said inner cavity, being diametrically smaller than said inner cavity so that a gap is formed radially between said cutter and said mounting head, and axially being snugly received in said cavity, with said cutter being free for orbiting radial shifting movement relative to said head within the limits of said gap, and with at least one of said cutter and said head including a plurality of circumferentially spaced seal slots extending axially of the gap and opening radially toward said gap, a radially reciprocating seal in each said slot, said seal circumferentially dividing said gap into a plurality of pulsed chambers, one between each adjacent pair of seals, a separate bidirectional flow passageway means extending through said mounting head into each pulse chamber, and means for distributing fluid pressure pulses from passageway to passageway, and thus from pulsed chamber to pulsed chamber, in repetitive cyclic fashion around the gap, tending to cause an orbiting radial shifting movement of said cutter wheel relative to said mount, and means for advancing said structure in a direction placing said cutter wheel into contact with material to be cut.

7. Mechanism according to claim 6, comprising a plurality of cutter assemblies, each oriented to contact and cut material as the machine is advanced, and wherein the generator means for at least one of said cutter assemblies delivers the pulses thereto out of phase with the pulses to at last one of the other cutter assemblies, so that at any given point of time the direction of cutter wheel movement for the former assembly differs from that of the latter.

8. A mining planar comprising a relatively heavy mass frame structure, means for moving said frame structure along a generally linear path, a cutter head extending laterally to one side of said frame structure and carrying a plurality of generally vertically oriented cutter wheel assemblies, each comprising a mounting head rigidly secured to the cutterhead, and a relatively small mass cutter wheel surrounding the mounting head, each said cutter wheel being free for 360° of limited radial movement relative to its mounting member unless it is restrained against such movement by rock resistance; and means for generating short duration radial force pulses between each cutter wheel and its mounting head, and for cycling said pulses throughout the 360°, to cause an orbiting radial shifting movement of the cutter wheels when they are unrestrained, and a counterdirectional orbital movement of said large mass backup structure when a said small cutter wheel is restrained, attended by a transfer of the inertial force of the moving backup structure to the rock through the cutter wheel.

9. Mechanism according to claim 8, wherein the force pulses are delivered to each cutter assembly out of phase with the force pulses delivered to the other cutter assemblies, so that the cutter wheels impact successively against the rock.

References Cited

UNITED STATES PATENTS

| | | | |
|---|---|---|---|
| 2,654,586 | 10/1953 | Berry | 299—14X |
| 2,659,585 | 11/1953 | McCallum | 299—14X |
| 3,235,230 | 2/1966 | Malan | 259—1 |
| 3,282,570 | 11/1966 | Malan | 259—1 |
| 3,419,313 | 12/1968 | Ulusal | 299—34 |

FOREIGN PATENTS

| | | | |
|---|---|---|---|
| 1,217,302 | 5/1966 | Germany | 175—55 |

ERNEST R. PURSER, Primary Examiner

U.S. Cl. X.R.

175—55; 299—14